United States Patent
Valli et al.

(10) Patent No.: US 7,778,189 B2
(45) Date of Patent: Aug. 17, 2010

(54) MAINTAINING AN EXISTING CONNECTION BETWEEN NODES

(75) Inventors: Jyrki Valli, Tampere (FI); Seppo Pohja, Tampere (FI)

(73) Assignee: Nokia Corporation, Espoo (FI)

(*) Notice: Subject to any disclaimer, the term of this patent is extended or adjusted under 35 U.S.C. 154(b) by 598 days.

(21) Appl. No.: 11/642,638

(22) Filed: Dec. 21, 2006

(65) Prior Publication Data

US 2008/0002686 A1  Jan. 3, 2008

(30) Foreign Application Priority Data

Jun. 30, 2006 (EP) .................. 06116432

(51) Int. Cl.
*H04L 12/28* (2006.01)
*H04L 12/56* (2006.01)
*G06F 15/173* (2006.01)

(52) U.S. Cl. .................. 370/244; 370/395.2; 370/392; 709/224

(58) Field of Classification Search ............. 370/392, 370/395.2, 244; 709/224
See application file for complete search history.

(56) References Cited

U.S. PATENT DOCUMENTS

2005/0180338 A1* 8/2005 Pirila et al. ................. 370/252
2005/0204039 A1* 9/2005 Douglis et al. .............. 709/225
2006/0069946 A1* 3/2006 Krajewski et al. ............ 714/6
2006/0168192 A1* 7/2006 Sharma et al. .............. 709/224
2006/0187926 A1* 8/2006 Imai et al. ................... 370/389
2006/0253611 A1* 11/2006 Hu et al. ..................... 709/245
2007/0218912 A1* 9/2007 Song et al. .................. 455/445
2008/0285520 A1* 11/2008 Forte et al. .................. 370/331

* cited by examiner

*Primary Examiner*—Alpus H Hsu
*Assistant Examiner*—Saad Hassan
(74) *Attorney, Agent, or Firm*—Alston & Bird LLP (57) ABSTRACT

Methods and systems for maintaining a connection between a first node and a second node communicating via a connection within a communication network. Data is communicated between the nodes on the basis of addresses assigned to the respective nodes. The addresses are managed by an address management node of the communication network. The system includes a detector unit, at the first node, configured to detect an outage of the existing connection between the nodes, a consulting unit, at the first node, configured to consult after detecting the outage of the connection, the address management node to verify the address assigned to the second node, a transceiver unit, at the address management node, configured to return a current address assigned to the second node, and a connection re-establisher unit, at the first node, configured to re-establish the connection based on the current address assigned to the second node.

23 Claims, 5 Drawing Sheets

MAINTAINING AN EXISTING CONNECTION BETWEEN NODES

FIELD OF THE INVENTION

The present invention relates to a method of maintaining an existing connection between a first node and a second node communicating with each other via a connection within a communication network, wherein data communicated between the nodes via the connection are communicated on the basis of addresses assigned to the respective nodes, and at least one of the addresses changes during the connection, as well as to a corresponding system and the respective nodes thereof.

BACKGROUND OF THE INVENTION

With recent progress in communication technology, various scenarios will arise in which an address of a node may change during a connection with another node. For example, a connection between nodes is broken or generally exhibits an outage, e.g. due to fast moving terminal nodes in mobile networks, or the like. Nodes such as terminals of end users or even servers acting as a node with which a terminal is communicating will, however, experience such outage (e.g. caused by a break/failure) in the connection as rather inconvenient. A temporary connection outage need not necessarily be caused by a connection failure which is usually related to e.g. a failure on the physical layer, though this is not excluded here. Rather, a connection outage as discussed in the present invention is mostly due to a node address change caused e.g. by a physical connection change or the like.

For the purpose of the present invention to be described herein below, it should be noted that

- a node may for example be any kind of communication device, such as a wireless or wired device, e.g. personal computer, mobile phone or the like, irrespective of a specific standard to which these conform as long as they are compatible to a communication network; a node may be a terminal (also referred to as client) or a server;
- for the communication network any suitable protocol for operating/message exchange is possible; only as an example it is noted that packet based communication networks such as IP based networks (e.g. conforming to IPv4 or IPv6) are particularly suitable to be used with the present invention;
- method steps likely to be implemented as software code portions and being run using a processor at one of the nodes, are software code independent and can be specified using any known or future developed programming language as long as the functionality defined by the method steps is preserved;
- generally, any method step is suitable to be implemented as software or by hardware without changing the idea of the present invention in terms of the functionality implemented;
- method steps and/or devices or parts of devices referred to as units likely to be implemented as hardware components at one of the server/terminal entities are hardware independent and can be implemented using any known or future developed hardware technology or any hybrids of these, such as MOS (Metal Oxide Semiconductor), CMOS (Complementary MOS), BiCMOS (Bipolar CMOS), ECL (Emitter Coupled Logic), TTL (Transistor Transistor Logic), etc., using for example ASIC (Application Specific Integrated Circuit) components or DSP (Digital Signal Processor) components, as an example;
- devices can be implemented as individual devices, but this does not exclude that they are implemented in a distributed fashion throughout the system, as long as the functionality of the device/system is preserved.

Although the present description will be given on a general level as the invention is applicable to any communication network, it is pointed out that the invention is most suitable for IP based networks.

For example, two nodes communicating with each other on an application level are having a so-called peer-to-peer communication. The application level is carried on a connection level. A level as mentioned here corresponds to a layer in a layered communication model. However, the present invention is not limited to a specific OSI layer or layers. (OSI=Open System Interconnection).

Nevertheless, a communication between two nodes as described in examples of scenarios to which the present invention is applicable, is not limited to a peer-to-peer communication. Rather, IETF (Internet Engineering Task Force) defines a client as a host (node) that initiates e.g. IP communication by sending the first packet to another node and a server as a host that—when idle—waits and listens to incoming packets from a client. In such a framework, two peers are nothing but two hosts that can assume the role of either a client or a server (or both). (Other definitions of peer-to-peer exist, too, in abundance.) Nonetheless, the invention is also applicable to a variety of client-server scenarios. Its applicability to peer-to-peer scenarios is a by-product of its applicability to client-server scenarios under the above-given definition of peer-to-peer.

For example, a peer-to-peer communication application between two nodes A and B may reside in a scenario as follows. A node (client) negotiates and establishes an IPv6 tunnel over an IPv4 connection to a tunnelling server. The tunnelling server and the intermediate IPv6 network then route IPv6 traffic to and from another node. The IPv4 connection may break or be subject to an outage unintentionally e.g. because of a node (e.g. a mobile phone) will move from one BTS area to another experiencing a change of the node's IP address of the IPv4 connection. The node may also change intentionally the IPv4 connectivity e.g. from GPRS to WLAN, if WLAN becomes available, which could also lead to a change of the IPv4 connection node address.

If the underlying IPv4 connectivity experiences an outage, the same applies as well to the IPv6 tunnel and possible peer-to-peer connections (with applications) that have been established between this node and other nodes.

This results in applications losing the peer-to-peer connections, and requiring from the user manual re-establishment of the connection.

In case of e.g. group VoIP (Voice over IP) communication as an application example, with members of the VoIP group moving around in a metropolitan area, the usability of the application would be ruined if in practice every time you want to communicate with the group you would first have to manually check with whom you have lost the connection, and re-establish the connections manually. Otherwise the peers/nodes that have dropped the (peer-to-peer) connection with your node will not receive the VoIP message.

To summarize, there are situations emerging which lead to the problem of how a node can maintain IP-connectivity or generally an ongoing communication connection with another node, whose IP-address changes, without terminating the application(s) running between the nodes on top of it, i.e. on top of the IP connectivity layer. This is especially critical for any type of real time applications, where the tolerable connection interruption time on the application layer is quite short. However, the applicability of the present invention as described hereinafter is not limited to real time applications. Rather, real time applications are merely referred to as an example for applications which fail in cases or require specialized code to cope with situations in which the address of a communication partner node changes. Generally, it is to be noted that the present invention is advantageously applicable to applications which fail in cases or require specialized code to cope with situations in which the address of a communication partner node changes. Real-time applications are only referred to as a descriptive example without limiting the scope of applicability of the present invention.

Irrespective of the above examples focusing on peer-to-peer scenarios, it has to be kept in mind that examples of client-server scenario also exist. The invention is also not limited to cases where tunnelling is used.

Generally, the following example cases are applicable, where one of the nodes has a public address to which traffic from another node can be routed (i.e. the node is addressable and reachable), and the address changes during an ongoing transmission between the nodes.

The public address is assigned to the node by e.g. a DHCP (Dynamic Host Configuration Protocol) server for a lease period. Upon lease expiration, the node gets a different address from the DHCP server.

The public address is assigned to the node by e.g. a NAT (Network Address Translation) or NAPT (Network Address Port Translation) server, which suddenly assigns a different address to the node.

The public address is assigned to the node by e.g. a tunnelling server, which suddenly assigns a different address to the node.

Thus, problems as those mentioned in the above examples may occur on any network, where the node address may change without a warning, e.g., on the Internet if the server uses dynamic DNS and its address changes, say, under DHCP.

Furthermore, in connection with IP based networks, Dynamic Domain Name Service (DynDNS) is widely know in the Internet and has been into use there for a long time. Nevertheless, DynDNS has not been used as a mechanism to recover from node address changes for real time traffic in a fast enough manner, to prevent terminating of e.g. the real time application running on top of the connection. Recovery from IP address changes for a standard DynDNS implementation is slow and takes some time (in the area of minutes, for example the minimum time-to-live time for caching of DNS entries is defined to 60 s).

SUMMARY

Hence, the present invention addresses the above mentioned problem to maintain an ongoing communication connection with another node, whose address changes, with minimal loss of performance and with minimal disturbance for an application carried on top of such a connection.

According to aspects of the present invention, this object is for example achieved by a method, system and nodes as defined in the respective independent claims Advantageous further developments of those aspects of the present invention are for example defined in respective dependent claims.

In detail, according to particular aspects of the present invention and respective sub-aspects thereof, there is disclosed a method of maintaining a connection between a first node and a second node, comprising: detecting, by the first node, an outage of an existing connection between the first and second nodes; consulting, by said first node, after detecting the outage of the connection, an address management node of a communication network to verify an address assigned to the second node; returning, from said address management node, a current address assigned to the second node; and re-establishing the existing connection, by said first node, based on the current address assigned to the second node; wherein data is communicated between the first and second nodes on the basis of addresses assigned to the respective nodes, and wherein the addresses are managed by the address management node of the communication network;

said detecting comprises receiving an error message that the connection to the second node is interrupted;

said detecting comprises experiencing a timeout when waiting for a response or acknowledgement from the second node;

the method further comprises assigning, to the second node, a current address, wherein the assigned address is associated with a life-time attribute, for the current address, for caching address_to_node_name mapping entries in other nodes than the address management node, the lifetime attribute being set to zero or about 0;

said consulting comprises monitoring a time interval, by said first node, responsive to the detection of the outage; realizing, by said first node, that the time interval expired; requesting, by the first node, the current address of the second node from the address management node responsive to realizing that the time interval has expired;

said consulting comprises trying to re-establish the connection to the second node by using an earlier known address of the second node until the time interval expires;

the timer is stopped and the process of re-establishing the connection ends, when the connection to node B could be re-established by using the earlier known address of the second node before the time interval expires;

data communicated between the nodes via the connection are data relating to an application carried on a layer above a layer of the connection, and a time interval monitored has a length that is shorter than a time required for the application to indicate a failure or terminate;

the outage of the connection is based on a change of logical or physical channels of the connection;

the connection changes from one type of connection to another type of connection.

Also, there is disclosed a computer program product comprising computer implementable instructions for carrying out the method according to any of the above aspects and sub-aspects when executed on a processor.

Further, there is disclosed a system configured to maintain an existing connection between a first node and a second node, comprising: a detector unit, at the first node, configured to detect an outage of an existing connection between the first and second nodes; a consulting unit, at said first node, configured to consult after detecting the outage of the connection, an address management node of a communication network to verify an address assigned to the second node; a transceiver unit, at said address management node, configured to return a current address assigned to the second node responsive to a request from the consulting unit to the first node; and a connection re-establisher unit, at said first node, configured to re-establish the connection based on a current address assigned to the second node, wherein data is communicated between the first and second nodes on the basis of addresses assigned to the respective nodes, and wherein the addresses are managed by the address management node of the communication network;

said detector unit comprises a receiving unit configured to receive an error message informing the first node that a message addressed from the first node to the second node was not delivered;

said detector unit comprises a receiving unit configured to experience a timeout when waiting for a response or acknowledgement from the second node, the system further comprises an address assignor node configured to assign a current address to the second node, the assigned address being associated with a life-time attribute, for the current address, for caching address_to_node_name mapping entries in other nodes than the address management node, the lifetime attribute being set to zero or about 0;

the consulting unit comprises a monitoring unit configured to monitor a time interval responsive to the detection of the outage, the monitoring unit being configured to realize that the time interval expires, and wherein the re-establisher unit is configured to request the current address of the second node from the address management node responsive to realizing that the time interval has expired;

said re-establisher unit is configured to try to re-establish the connection to the second node by using an earlier known address of the second node until the time interval expires;

the monitoring unit is configured to stop the timer unit and to end the process of re-establishing the connection, when the connection to the second node could be re-established by using the earlier known address of the second node before the time interval expires;

data communicated between the nodes via the connection are data relating to an application carried on a layer above a layer of the connection, and the time interval monitored has a length that is shorter than a time required for the application to indicate a failure or terminate;

the outage of the connection is based on a change of the logical or physical channels of the connection;

the connection changes from one type of connection to another type of connection.

In addition, there is disclosed a node comprising a detector unit configured to detect an outage of an existing connection between the first node and a second node via a communication network; a consulting unit, configured to consult after detecting the outage of the connection, an address management node of a communication network to verify the address assigned to the second node; and a connection re-establisher unit configured to re-establish the connection based on a current address assigned to the second node;

said detector unit comprises a receiving unit configured to receive an error message informing the first node that a message addressed from the first node to the second node was not delivered;

said detector unit comprises a receiving unit configured to experience a timeout when waiting for a response or acknowledgement from the second node;

the consulting unit comprises a monitoring unit configured to monitor a time interval responsive to the detection of the outage, the monitoring unit being configured to realize that the time interval expires, and wherein the re-establisher unit is configured to request a current address of the second node from the address management node responsive to realizing that the time interval has expired;

said re-establisher unit is configured to try to re-establish the connection to the second node by using an earlier known address of the second node B until the time interval expires;

the monitoring unit is configured to stop the timer unit and to end the process of re-establishing the connection, when the connection to the second node could be re-established by using the earlier known address of the second node B (ADDR B) before the time interval expires;

data communicated between the first node and the second node via a connection comprises data relating to an application carried on a layer above a layer of the connection, and wherein the time interval monitored has a length that is shorter than a time required for the application to indicate a failure or terminate.

Further, there is disclosed an address management node (Addr_Serv), comprising a transceiver unit configured to return a current address assigned to a second node responsive to a request from a consulting unit of a first node;

the address management node further comprises a management unit configured to manage a current address of the second node by writing the current address into or fetching the address from a memory unit of the address management node.

Additionally, there is disclosed an address assignor node, configured to assign a current address to a second node, the assigned address being associated with a life-time attribute, for the current address, for caching address_to_node_name mapping entries in other nodes than the address management node, the lifetime attribute being set to zero or about 0.

Thus, stated in other words, if a first node A is facing a situation where it is about to abandon an application and/or a connection to a second node B, because e.g. a "timeout limit" is reached for the application or the connection (i.e. the sent packets are not reaching node B anymore), the invention proposes for example that node A makes a query to an address management node such as e.g. a DNS query on node B in order to check if the IP-address of node B has changed, before the application running on top of the connection or the connection is finally terminated. If the first node A recognises that for example the IP address of the second node B has changed, Node A starts resending of the packets to the new IP-address of node B before the application or the underlying connection is timed out, in order to maintain the connection.

Note that the expression "addresses being managed by an address management node of the communication network" is to a certain extent a simplification for explanatory purposes. The invention relates for example to a (generalization of) a scenario where dynamic DNS is used in the IP world: Each node has an address (=IP-address) and a name (=hostname e.g. www.nokia.com). The communication network provides a name-to-address mapping function (=DNS) that a node can use to learn the address of another node based on the name. The invention is particularly useful in cases where the address of the node may occasionally change and where the node consequently updates the address mapped to its name in the name-to-address function (which implies in a specific example that the DNS is a dynamic DNS). For the purposes of this invention, the name can be assumed unchanging.

Thus, address management describes the keeping track of the address assigned to a node of a given name and the possibility to provide for a looking-up of the node to address assignment. Assigning of the addresses can be accomplished separately from the "address management", e.g. by a DHCP server entity, although both functions could reside in the same network node.

The invention relates under a particular aspect to tackling the problem of maintaining (IP-)connectivity with another node whose (IP-)address changes due to break-up in (IP) connectivity. Nevertheless the present invention is not limited to specific types of networks and could be used always when the address (e.g. IP address) of one party during an ongoing call changes and the (IP) connectivity shall be maintained. Note, changing of (IP) addresses might happen for example due to a temporary connection interruption (outage), when changing the connection from e.g. GPRS to WLAN, if WLAN becomes available, or when the lease time for an IP address expires and the node gets a new IP address assigned by e.g. a DHCP server.

Accordingly, with the present invention, at least the following advantages can be achieved, whether individually or in combination:

According to an aspect of the present invention, a method comparable with DynDNS is suggested, which is improved with respect to the performance response time.

Moreover, the present invention provides IP mobility support for e.g. real time applications. Applications are kept alive if the local and/or remote node IP address changes, even if also a (tunneling) server IP address changes.

The method/mechanism and nodes of the system as described under aspects of this invention can be applied in any network where mobility shall be supported.

The invention improves usability of e.g. a tunneling network scenario as connections are automatically re-established instead of manual re-establishment.

BRIEF DESCRIPTION OF THE DRAWINGS

The aspects of the present invention will hereinafter be described with reference to the drawings, in which.

DESCRIPTION OF ASPECTS OF THE PRESENT INVENTION

The aspects of the present invention will now be described with reference to the accompanying Figures in more detail. The present invention is applicable to all above described example scenarios, even though the following description may focus on only one of these examples or only on a common aspect thereof.

Figure 1:
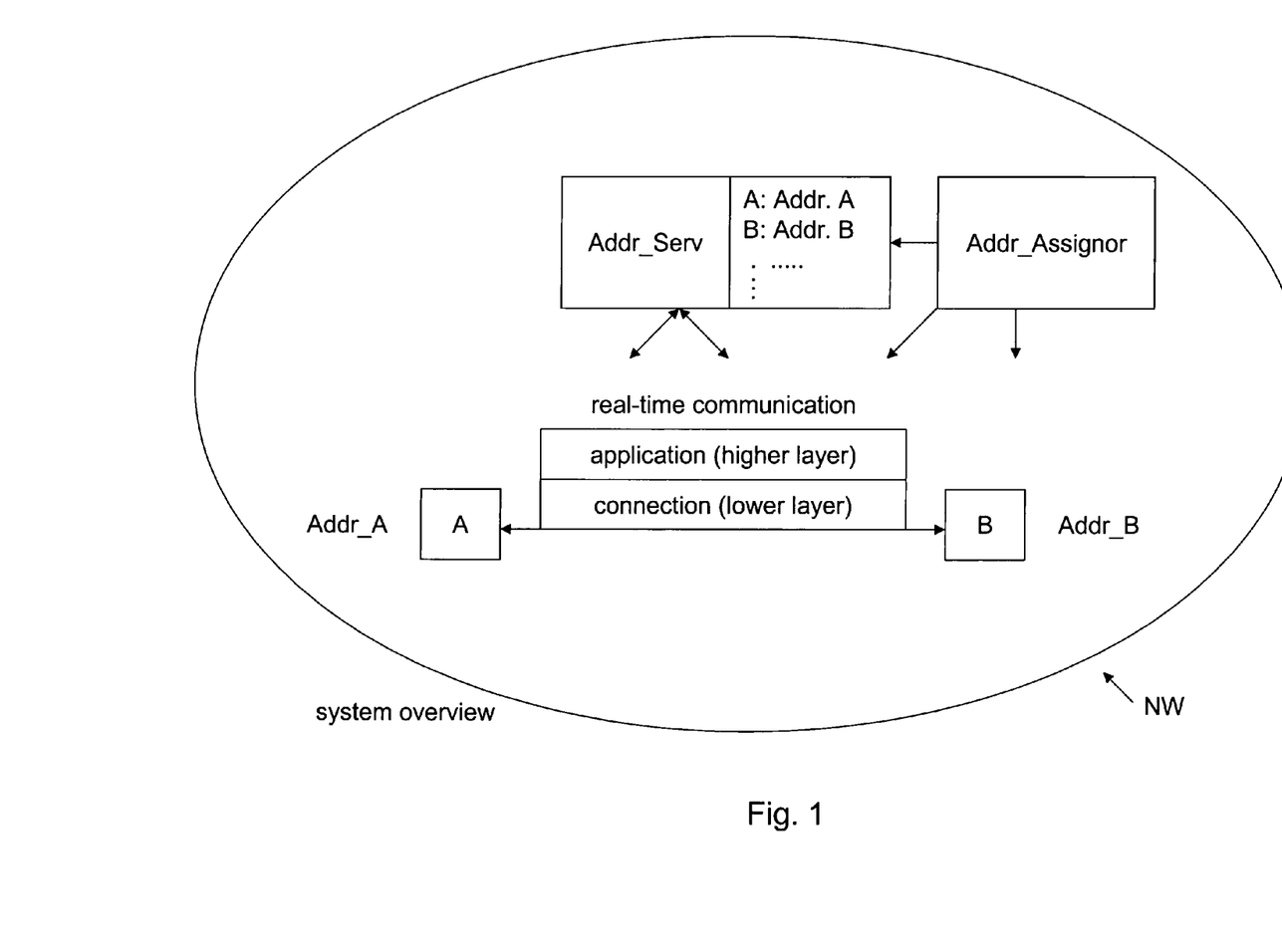
FIG. 1 shows an overview of the system according to the present invention.

FIG. 1 shows an overview of the system according to an aspect of the present invention. As shown in FIG. 1, the system comprises a (part of a) network NW. The network comprises a first node A and a second node B. The nodes A, B are identified by respective addresses ADDR_A and ADDR_B. Data communicated between the nodes A, B are communicated on the basis of these addresses assigned to the respective nodes. Addresses are assigned to the respective nodes by an address assignor node "Addr_Assignor". Indicated by arrows is the functionality that the nodes A, B to which addresses are assigned are informed about the assigned addresses. Also, the address assignor node may inform a further node within the network of the (new) address to node name assignment, address management node "ADDR_SERV" of the communication network which is also shown in FIG. 1 and which manages the address to node name assignments so that these can be looked-up. Note, that there may exist also other ways how to inform the address management node about (new) address to-node name assignments (e.g. the address management node is informed by the node itself which receives the new address). The address management node ADDR_SERV has thus knowledge of the addresses assigned to the nodes in the networks, receives requests for node address information for requested node names, and returns the information concerning assigned addresses as illustrated by the double arrows at the address management node ADDR_SERV. Associated to or part of the address management node is a memory in which the addresses to node names mapping is maintained. FIG. 1 shows that node A is assigned address ADDR_A and node B is assigned the address ADDR_B. Furthermore, as shown in FIG. 1, an existing connection is established and ongoing between the first node A and the second node B. In the illustrated case, it is assumed that as an example a real-time communication (application) is established via this connection. The illustrated real-time communication comprises at least two layers. These are the connection layer as the lower layer and an application layer as a higher layer. The connection layer serves to transport the data on the physical/logical channels, and the application layer is a higher layer application in relation to which payload/use data are communicated.

The present invention is not limited to a particular communication network or network system. The nodes can be wired nodes or wireless nodes. The communication is for example packet based and can be based on the Internet protocol IP. It is not important which protocol version is concerned (IPv4 or IPv6, or any other). In case of an IP based network, messages communicated between the nodes are IP packets and the address management node is a name server such as a DNS (Domain Name Service) server, while the address assignor is e.g. a DHCP server. In case of a communication network based on IPv6, the messages communicated are also IP packets based on that protocol version and the address management server is a dynamic DNS server. Still further, it is possible that the present invention is applied in a scenario or architecture involving tunneling. In such a scenario, the connection layer can be an IPv4 layer and the application layer can for example be a tunneled application based on IPv6.

Figure 2:
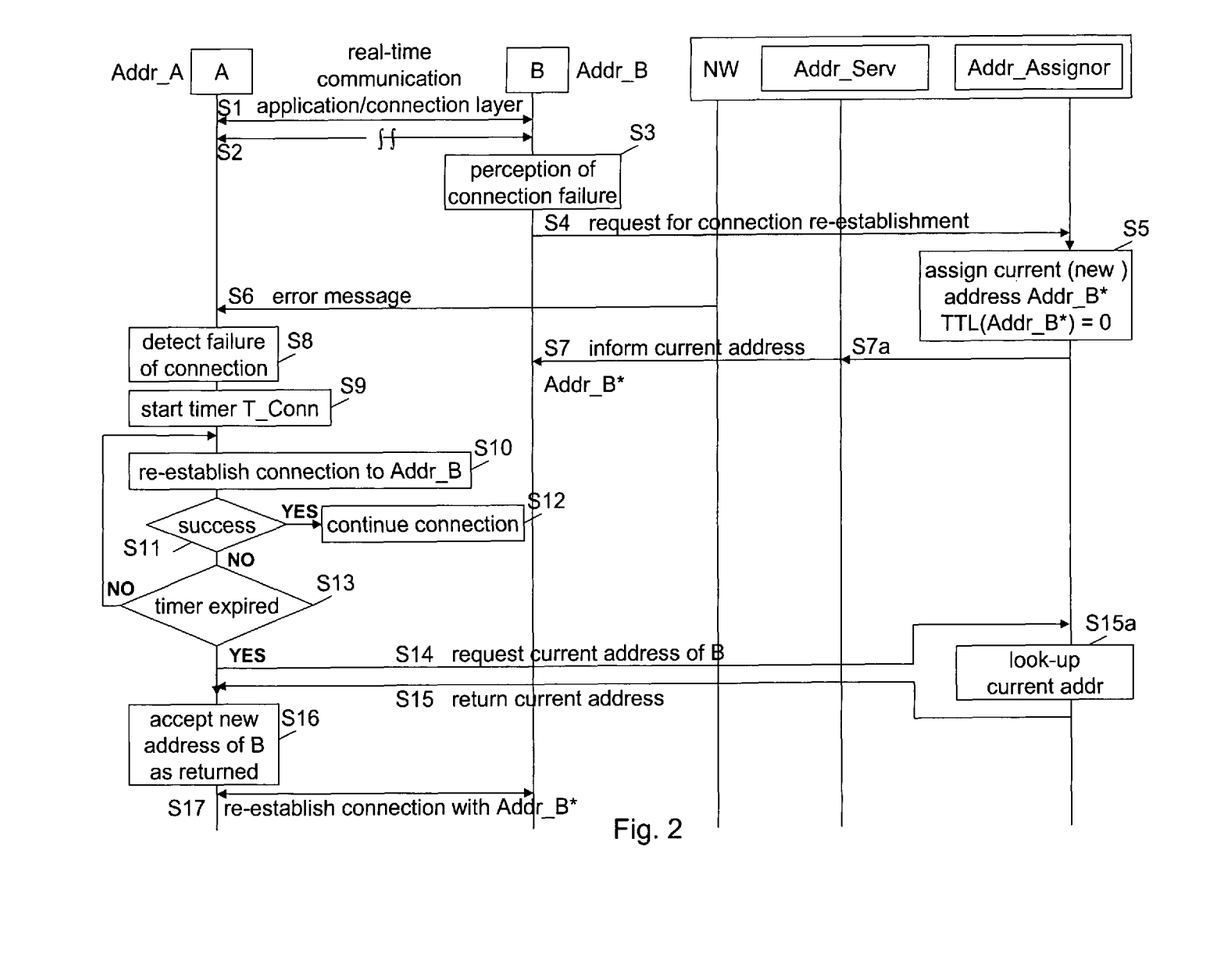
FIG. 2 shows a signaling diagram of aspects involved in the present invention.

FIG. 2 shows a signaling diagram of signaling and processing performed in an example scenario at respective nodes. In the horizontal direction, the nodes involved are illustrated whereas the vertical sequence of processing steps/signaling messages reflects the sequence in time in a rough outline.

As shown in FIG. 2, the system constituents already described above with reference to FIG. 1 are involved. Other nodes and/or network entities are not shown merely for the reasons of keeping the explanation and drawings simple and easy to understand. It is, however, not excluded that depending on the actual network concerned to which the present invention may be applied, corresponding further network entities are involved in the background without influencing the aspects of the present invention described herein in order to contribute to the, in other aspects, normal "behavior/functioning" of the network.

As shown in the example scenario of FIG. 2, node A has an ongoing, for example real-time, communication with node B. Node A is assigned address ADDR_A and node B is assigned address ADDR_B. The real-time communication in the example scenario relies e.g. on a peer-to-peer application layer (higher layer) on top of a connection layer (lower layer) as shown in FIG. 1. This is illustrated by the bidirectional arrow labeled S1. At a certain point of time during the ongoing e.g. real-time communication, the connection at the lower layer "fails" or experiences an outage, as illustrated in by the interrupted arrow labeled S2 in FIG. 2. Causes for such an outage could be for example:

a connection interruption on the lower layer
a change from one connection type to another connection type
handover of the connection (e.g. to another base station)
node address change (e.g. due to DHCP lease time expiry).

In one example scenario, as illustrated and assumed in FIG. 2, such outage may be caused e.g. due to disruption in coverage of the network such as loosing data connection coverage in a GPRS or 3G network environment. In such scenario, Node B perceives such connection outage or failure in step S3. Responsive to this perception, the second node B automatically requests re-establishing the lower layer connection to the network NW in step S4. According to one particular aspect of such automatically requesting re-establishing the connection, such request is forwarded within the network NW to the address assignor node ADDR_ASSIGNOR. In an example implementation, the address assignor may be realized as a DHCP server, IP tunneling server providing an IP address for the other end-point of the tunnel, or similar entity. In a step S5, the address assignor node of the communication network assigns a new lower layer address ADDR_B* to the second node B.

Note that dependent on the implementation, assigning of a new address may not necessarily be request based, but could also be accomplished automatically once the address assignor node is informed by a mechanism different from a request of the node B. In this regard, as an alternative example not shown in FIG. 2, transparently for the node B, a certain mechanism accomplishes assignment of a new address to node B. Step S5 is thus performed at the address assignor based on a trigger event differing from the request in step S4 from node B.

Just as an example for such an trigger event, the lifetime of an address assigned to node B may expire (for example the DHCP lease time) and a new address is thus necessary to be assigned to node B. Steps S3 and S4 shown in FIG. 2 then do not occur. Further, in such scenario, the connection outage experienced in step S2 would occur rather as a result of that address change since data transmitted from node A to node B based on the old address of node B can no longer be delivered to node B with the new address being assigned thereto. Thus, step S5 takes place prior to step S2 in such a modified scenario.

To clarify, the previously ongoing e.g. real-time communication with node B was based on node B's address ADDR_B. In step S5, the current (new) address ADDR_B* is assigned to node B. Furthermore, optionally, the address assignor node sets a lifetime attribute for caching of the address to name mapping of the second node B in other nodes than the ADDR_SERV to zero, or close to 0. For example, in case of the address assignment being performed in line with DNS (Domain Name Service) the lifetime attribute is TTL (Time To Live) for caching and this attribute is set to zero or close to 0. By doing this it is avoided that the address to node name mapping is cached in other nodes than the ADDR_SERV. Thus a DNS query on the node name will result always in an address look-up operation done by or at the ADDR_SERV node. The assigned new address ADDR_B* is informed to the address management node ADDR_SERV, e.g. in step S7a and further to the node B in step S7. This informing of the new address can occur in two different transmissions, or in one transmission (e.g. S7a) which is relayed (S7) from the address management node further to the node concerned, node B.

Note that such a lifetime attribute for caching, such as the TTL value, is typically set just once per given address to name mapping entry, i.e. DNS entry, at the time of the creation of the entry. In rare cases, it might be updated too, if some maintenance work is done. Thus, no changes are usually done to the lifetime attribute (e.g. TTL) at the time when the (e.g. IP) address changes. The e.g. TTL value is already zero or near zero when the address changes and the invention is applied. This being said, it is to be noted that it is of a subordinated aspect of the present invention which entity of a network sets the TTL value, as long as it has been set. In certain scenarios, and when referring to a DNS scenario to which the invention is applicable, the owner of the DNS entry (i.e. the person or organization who own e.g. the name "host-.somedomain.com") is given credentials to a management interface of the DNS, so that they can create and/or maintain the DNS entry. Typical scenarios today are: owner uses the web-based management interface provided by the DNS and sets the value manually or owner has some management software that programmatically interfaces with the DNS and sets the value.

In case of Dynamic DNS, the owner often places a DynDNS client in the computer, whose DNS entry is being updated, and it updates the DNS entry when the IP address changes. The DynDNS client is, in essence, an example of the management software that programmatically interfaces with the DNS—except—the DynDNS client does not touch the TTL. (In principle it could designed to do that too, but there is no need since the TTL value is assumed constant).

For the purpose of the present invention, it can thus be assumed that the lifetime attribute such as the TTL value as present also in regard to the addresses managed in the address management node has been set by some mechanism or entity. Thus, there is a one time operation of setting the e.g. TTL value first—before remaining aspects/features of the invention take place such as the address change, the DNS entry update (note: no TTL value update), the check of the other node whether the DNS entry has been updated, etc., which have already been or will in the following be described herein above or below.

Note, this is just one way how the new address (ADDR_B*) is assigned to the node B and how the address management node (ADDR_SERV) is informed about the address change. Another option not shown in FIG. 2 could for example be that the ADDR_ASSIGNOR node assigns and informs the new address (ADDR B*) directly to the second node B, and the second node B takes care about the update of the address to node name entry in the look-up table of the address management node (ADDR_SERV). _The actual manner in which the new address is informed to the address management node ADDR_SERV and the node B is of no importance for the present invention.

In step S8, the node A detects that the (previously) existing connection to node B is interrupted (for example by receiving an error message from the network as shown in step S6 or by experiencing a timeout when waiting for a response from node B in step S8). In the context of the present invention it is not important how the connection outage is detected. Step S6 and S8 can be advanced in time and perhaps occur during the period of time in which steps S3, or S4 (if present in the actual scenario concerned), or S5 are taking place. In any case, the timing relation of message S6 and S8 in relation to steps S3, S4, S5 is of no importance in the present invention.

After detecting the connection outage of the communication in step S8, the first node A will consult the address management node ADDR_SERV of the communication network NW to verify the address assigned to the second node B, if the connection to node B can't be re-established in a defined period of time.

To this end, the first node A starts a timer in step S9 after the connection outage in step S8 has been detected. The timing value or time value is labeled as T_CONN to indicate the time interval is related to the connection layer. This time interval T_CONN has a length that is shorter than the time required for the application carried out in the application layer to indicate a failure and probably to terminate the application.

Generally, a connection outage or failure can have various reasons. For example, the outage of the connection is based on a temporary interruption of the logical or physical channels of the connection. Also, the outage of the connection is for example based on a change of the logical or physical channels of the connection. Such a change can occur if the connection changes from a first type of connection such as GPRS or WLAN (GPRS=General Packet Radio Service, WLAN=Wireless Local Area Network) to a second type of connection such as WLAN or GPRS. This is a special case of a "handover" where the handover occurs to a different connection type. In another case, the change of the logical or physical channels can for example be based on a handover within the same connection type. In both cases the address of the remote node, i.e. node B when referring to the example described here, could change, but could also remain the same.

During the monitored time interval which is monitored by the timer, the first node A tries to re-establish the connection based on the previous known address ADDR_B of the second node B, see S10. If this was found to be successful in step S11, the connection is continued in S12 (this might be for example the case if a handover within the same connection type happens, e.g. between two adjacent base stations). However, such situation is not the main concern of the present invention.

In such case, the timer is stopped and the process of re-establishing the connection ends, when the connection to node B could be re-established by using the earlier known address of node B (ADDR B) before the time interval expires.

If, however, the connection re-establishment to the known (previous address ADDR_B) was found to be not successful in Step S1, it is checked in step S13 whether the timer expired. If not, the processing at node A returns from step S13 to step S10. If it is found in step S13, that the timer expired, node A realizes this and responsive thereto, requests the current address of the second node B from the address management node ADDR_SERV in step S14. The address management node ADDR_SERV in step S15a responsive thereto, looks-up the current address ADDR_B* of node B in a memory unit thereof, e.g. a look-up table realized as a RAM (random access memory) or flash memory or the like, and returns the current address assigned to the second node B (ADDR_B*) to the first node A in step S15. The first node A then accepts the current address ADDR_B* assigned to the second node B as returned from the address management node ADDR_SERV, and replaces the internal stored previous address of the node B (ADDR_B) with the (new) current address of node B (ADDR_B*). Node A uses then the stored (current) address of node B (ADDR_B*) for communicating with the second node B and re-establishes in step S17 the connection to the second node B.

Figure 3:
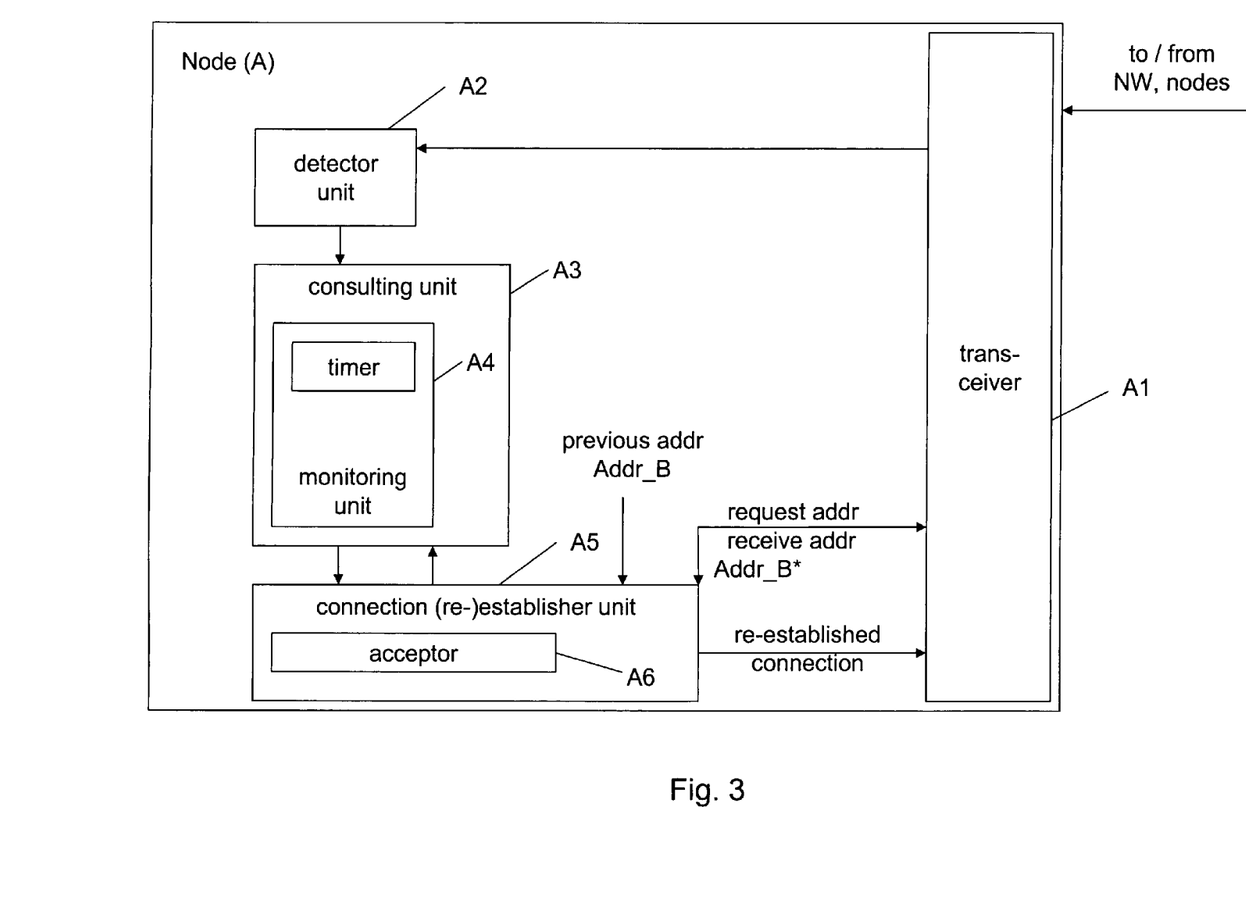
FIG. 3 shows a block diagram of a node (node A) according to the present invention.
Figure 4:
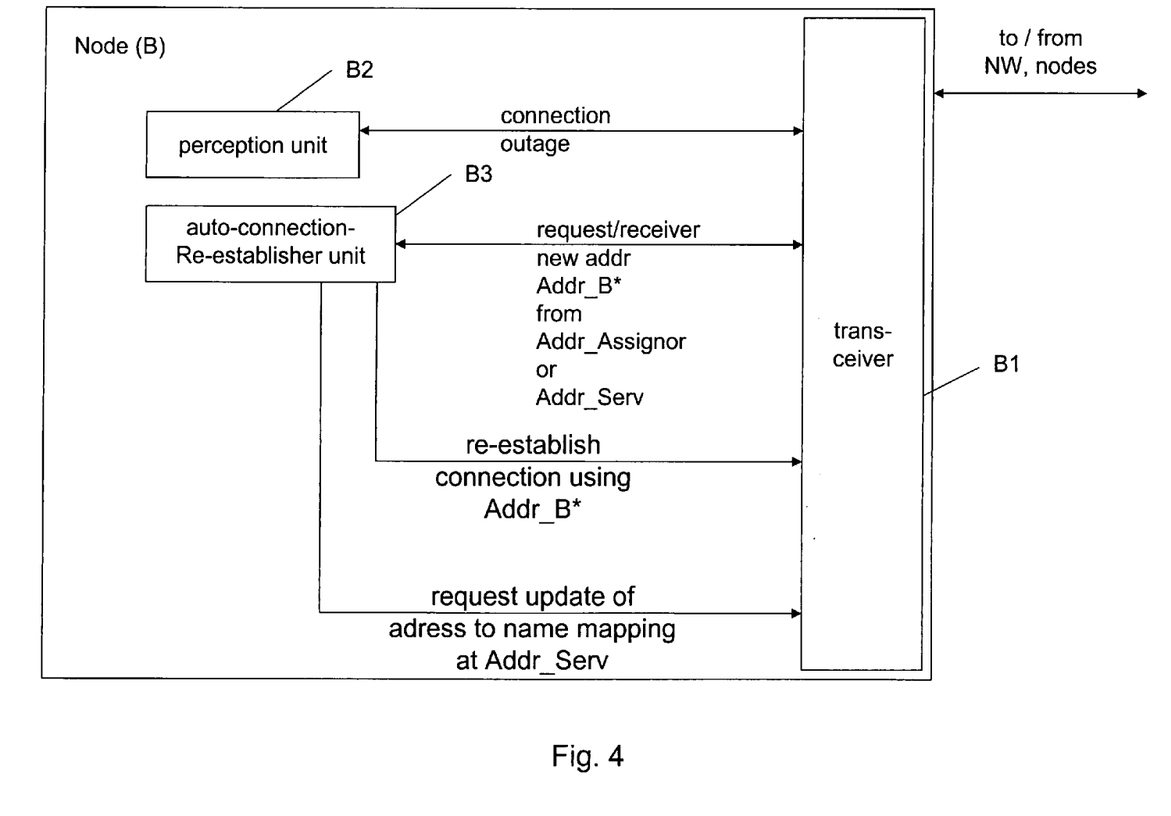
FIG. 4 shows a block diagram of a node (node B) according to the present invention.

FIG. 3 shows a block diagram of the first node A and FIG. 4 shows a block diagram of the second node B referred to hereinabove. For the sake of clarity, it is pointed out that every node, whether A or B can have the functionality and internal construction as shown with regard to node A and with regard to node B. This means, the functions performed depend on which node involved in the communication perceives first the connection failure or is assigned a new address first. However, for the sake of clarity of the explanation of the present invention, these aspects of the present invention are described with reference to separated figures in order to keep the explanation simple. It is, however, to be understood that each node can combine the functionality of node A as described herein as well as of node B as described herein. Also, any of the nodes may be a terminal or client (e.g. of a end user) or a server within a network.

FIG. 3 shows a block circuit diagram of a node, node A referred to in the present invention as a first node and in connection therewith one first aspect of the present invention is explained.

As shown in FIG. 3, node A has a transceiver unit A1 which is configured to receive and to send messages/data from and to the network and/or other nodes within the network. Those nodes can be communication partner nodes or other network entities constituting the communication network. It is to be noted that any node here need not necessarily be a terminal of a user, but may also be a network node such as a server. The node comprises further a detector unit A2 which is configured to detect an outage of an existing connection between this node and another node via a communication network. The detector unit is either configured to receive an error message via a receiving unit (not shown) constituting part of the transceiver unit A1 (transmitter/receiver), or is configured to detect the connection outage by itself (e.g. by experiencing a timeout when waiting for a response from the other node. For example, instead of an error message the detector may await an acknowledgment message, and the absence of receipt of such acknowledgement message for a defined time period may result in detection of the connection outage). The receiving unit is configured to receive an error message from the network informing the first node about the connection outage and forwards it internally within the node A to the detector unit A2. (Alternatively, the receiving unit is configured to (normally) receive an acknowledgement message and to forward it to the detector unit). The detector unit is connected to a consulting unit A3. The detector unit thus triggers the consulting unit A3 upon detecting an outage of an existing connection. The consulting unit is configured to consult, after detecting the outage of the connection, an address management node ADDR_SERV of the communication network to verify the address assigned to the second node B (communication partner node such as a second terminal or a server). The consulting unit is equipped with a monitoring unit A4 comprising a timer configured to monitor a time interval responsive to the detection of the outage. The monitoring unit/timer A4 is configured to realize that the time interval expires. According to an option, during the timer monitoring the time interval, the consulting unit may instruct a connection establisher unit/connection re-establisher unit A5 to try to re-establish the connection based on a previous address (in the example ADDR_B) of the second node B. According to the above option, if this is not successful, the connection re-establisher unit A5 returns the corresponding result to the consulting unit which in turn instructs the connection re-establisher unit A5 again to try to re-establish the connection via the transceiver unit A1. This exchange of data between the consulting unit A3 and the connection re-establisher unit A5 is expressed in FIG. 3 by the two arrows indicating this signaling between these nodes and in FIG. 2 by the loop between steps S10 and S13. In case the connection could not be re-established during or upon lapse of the time interval, the consulting unit A3 instructs the connection re-establisher unit A5 to request the current address of the second node B from the address management node ADDR_SERV.

Alternatively, the consulting unit may simply await timer expiry before instructing the connection re-establisher unit to re-establish the connection based on the previous address of the second node.

The request for the current address of the second node B is forwarded from the re-establisher unit A5 via the transceiver unit A1 to the address management node. Similarly, the new address ADDR_B* is received at the transceiver unit A1 of the node and forwarded internally to the connection re-establisher unit A5.

The connection re-establisher unit comprises an acceptor unit A6. This acceptor unit A6 is configured to accept the current address assigned to the second node B as returned from the address management node ADDR_SERV, i.e. the newly assigned address ADDR_B*, as it is for use by the first node A for communicating with the second node B via the connection. The re-establisher unit A5 is configured to re-establish the connection to the second node B, based on that accepted returned (new) current address ADDR_B* assigned to the second node. The functionality realized by these units corresponds to steps S16, S17 shown in FIG. 2. Note that the node A may have obtained the knowledge of the previous address ADDR_B in a similar way as obtaining the knowledge of the current address ADDR_B*.

FIG. 4 shows a block diagram of a second node B and aspects involved therewith according to the present invention. Note again that the functionalities/units of the first and the second node can simultaneously be present in one of the nodes, but that these aspects/functionalities are described merely distinctly to keep the description and explanation simple to understand.

As in FIG. 3, the node B shown in FIG. 4 comprises a transceiver unit B1 configured to receive and send messages/requests and/or data from and to the network and other nodes.

According to the scenario illustrated in FIG. 2, the node B comprises a perception unit B2 which is configured to perceive an outage of the connection between the node B and another node. The another node can be a terminal or a server. To this end, the perception unit B2 is in cooperation with the transceiver unit B1 in order to acquire the necessary information concerning the connection. Once the perception unit B2 perceives an outage of the connection, the perception unit B2 instructs an auto connection re-establisher unit B3 to automatically request re-establishing of the connection. To this end, the auto connection re-establisher unit B3 requests a new address to be assigned to the node from the address assignor node ADDR_ASSIGNOR via the transceiver unit B1. Also, via the transceiver unit B1, the auto connection re-establisher unit B3 receives the requested new address from either the address assignor node directly or via the intermediate of e.g. the address management node, as explained above in connection with the signaling in FIG. 2. Other signaling paths are also optionally possible, as long as the node B is informed from the network and/or its entities of the newly assigned current address. Upon receipt thereof, the auto connection re-establisher unit B3 then uses this new, current address ADDR_B* to re-establish the connection via the transceiver unit B1.

Alternatively, according to the option described in connection with FIG. 2 but not shown in FIG. 2, a new address may be assigned by the address assignor to the node B without a preceding request of the node itself. For example, in case the lifetime of the address expires, a new address is assigned to the node B by the address assignor. The new address is then informed to the node B e.g. from the address assignor directly via the transceiver unit B1, e.g. at the auto-connection re-establisher unit B3 or another internal unit of the node B. Likewise, if the new address is informed directly to the node B and the address management node ADDR_SERV is not yet aware of the new address to name mapping for the node B, the node B may instruct an update of the address to node name mapping at the address management node ADDR_SERV. This may also be accomplished by the unit B3 of the node B in cooperation with the transceiver unit B1.

Figure 5:
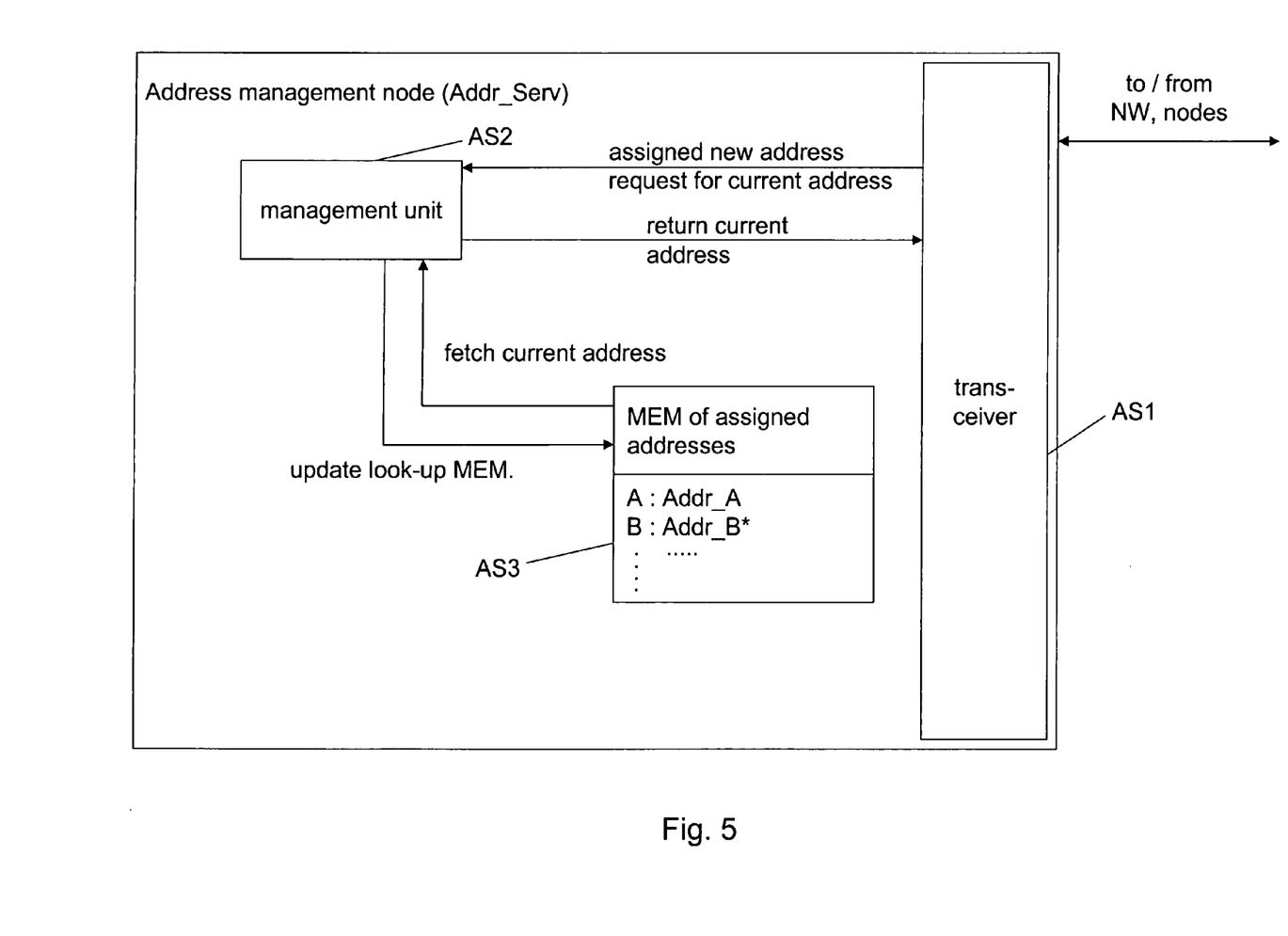
FIG. 5 shows a block diagram of an address management node (ADDR_SERV) according to the present invention.

FIG. 5 shows a block circuit diagram of the address management node ADDR_SERV. As mentioned before, in case of an Internet protocol based communication network, such an address management node may be implemented as a Domain Name Service server, DNS server.

As shown in FIG. 5, the address management node ADDR_SERV comprises a transceiver unit AS1 configured to exchange data/messages with other network entities and/or nodes such as nodes A, B and the address assignor server (described above mainly in relation to FIG. 2). In particular, the transceiver unit AS1 forwards internally to the address management node a new address to node name mapping received from the address assignor node or some other source (e.g. from the node which received a new assigned address itself such as the node B). Such new address is forwarded to a management unit AS2. The management unit AS2 of the address management node is configured to manage responsive to receipt of such a (new) address from the address assignor node, or from the node itself, a current address of the second node B. This means that the management unit AS2 updates a look-up table in a memory AS3 of the address management node with the new/current address, i.e. it replaces address ADDR_B for node B by ADDR_B* for node B. This assigned new address ADDR_B* can optionally be informed via the transceiver unit AS1 of the address management node to the second node, node B (in case of a scenario as explained above related to step S7 in FIG. 2). Furthermore, associated to the management unit AS2, the address management node comprises a memory AS3 in which addresse(s) to node name mappings are maintained. Assigned addresses are updated therein by means of a write operation and read therefrom by means of a fetch operation. The memory unit AS3 is thus e.g. a RAM or a Flash memory or any other memory to which data can be written and from which data can be read. In the presently illustrated example, this memory contains address ADDR_A for node A and the newly assigned (current) address ADDR_B* for node B. The size of this memory depends on the size of nodes/network addresses of nodes managed by the address management node.

Thus, as explained herein before in detail, but now stated in other words, the invention could be described briefly as follows: A first node A has set-up e.g. a real time communication with a second node B. For some reasons the address of the second node B changes e.g. the IP address in case of an IP based connection. Concerning Node B, there is an immediate update of its address associated to its node name to an address mapping table/look-up table in the address management node's memory, such as DNS server's memory. In this context, optionally a life-time attribute for caching this mapping information in other nodes (such as time to live (TTL)) is set to 0 or close to zero. Node A detects that it can't reach node B anymore. Node A starts a timer and optionally tries to re-establish the connection to node B with the last known (e.g. IP based address) settings. The timer expires before the upper layer applications are timed out. When the timer expires, node A re-checks the (IP) address of node B via e.g. DNS query to retrieve the current/new address. Node A re-establishes the connection by using the returned IP addresses from the DNS query concerning node B's address to name mapping.

Hereinbefore, the present invention has been described on a general level as it is applicable to nearly all address based communication networks. Therefore, reference has been made to specific names of nodes in such networks only by way of example. Depending on the communication network to which the present invention is applied, the actual names of the nodes may differ from the examples used herein.

As mentioned before, the present invention is also applicable between e.g. a node A and a server B. The connection between these can also be a tunnelling connection.

For example, when the node A (client) connects to the server B it negotiates and establishes e.g. an IPv6 over an IPv4 tunnel with the (tunnelling) server. The IPv4 (lower layer) connection may experience an outage e.g. because of mobile phone node handover with resulting IPv4 address change. The node may also change intentionally the IPv4 connectivity e.g. from GPRS to WLAN, if WLAN becomes available, which might result also in an IPv4 address change. If the underlying IPv4 connectivity breaks, it breaks as well the IPv6 tunnel and possible peer-to-peer connections that have been established between this node and other nodes.

This invention makes it possible to re-establish the peer-to-peer (node-to-node) connections automatically after an outage in IPv4 connectivity before the application utilising the IPv4 tunnel breaks. A outage in IPv4 connectivity means here such loss and re-establishment of IPv4 connectivity that results in a change of the IPv4 address allocated to the node.

The invention is generally applicable to similar cases in other tunnelling scenarios and protocols. It is also be generally applicable to any network where the IP-address changes and where there is a naming service such as a dynamic DNS, which is updated after the new address has been obtained (from an address assigning server or node).

As disclosed above, the present invention refers to a method performed in and corresponding nodes constituting a system which is configured to maintain an existing connection between a first node A and a second node B communicating with each other via a connection within a communication network. Data are communicated between the nodes A, B via the connection on the basis of addresses assigned to the respective nodes. The addresses are managed by an address management node Addr_Serv of the communication network. The system comprises a detector unit A2, at the first node A, configured to detect an outage of the existing connection between the nodes A, B, a consulting unit A3, at said first node A, configured to consult after detecting the outage of the connection, the address management node Addr_Serv of the communication network to verify the address assigned to the second node B, a transceiver unit AS1, at said address management node Addr_Serv, configured to return a current address assigned to the second node B responsive to a request from the consulting unit to the first node, and a connection re-establisher unit A5, at said first node A, configured to re-establish the connection based on the current address assigned to the second node B.

Various modifications to the present invention as outlined herein above are possible without departing from the spirit and scope of the present invention as defined in the appended claims.

The invention claimed is:

1. A method, comprising:
    detecting, by a first node, an outage of an existing connection between the first node and a second node, wherein an address of the first node has not changed;
    requesting, by said first node, after detecting the outage of the connection, from a name-to-address mapping node of a communication network, a current address assigned to the second node;
    receiving, from said name-to-address mapping node, a current address assigned to the second node; and
    re-establishing the existing connection, by said first node, based on the current address assigned to the second node,
    wherein data is communicated between the first and second nodes on the basis of addresses assigned to the respective nodes, and wherein the addresses are managed by the name-to-address mapping node of the communication network.

2. The method according to claim 1, wherein
said detecting comprises receiving an error message that the connection to the second node is interrupted.

3. The method according to claim 1, wherein
said detecting comprises experiencing a timeout when waiting for a response or acknowledgement from the second node.

4. The method according to claim 1, further comprising:
assigning, to a second node, a current address,
wherein the assigned address is associated with a lifetime attribute to cache address-to-name mapping entries of the second node in other nodes than the name-to-address mapping node, the lifetime attribute being set to zero or about zero.

5. The method according to claim 1, wherein
said consulting requesting comprises:
    monitoring a time interval, by said first node, responsive to the detection of the outage;
    determining, by said first node, that the time interval has expired; and
    requesting, by the first node, the current address of the second node from the name-to-address mapping node responsive to realizing that the time interval has expired.

6. The method according to claim 5, wherein
said requesting comprises attempting to re-establish the connection to the second node by using an earlier known address of the second node until the time interval expires.

7. The method according to claim 6, wherein
monitoring the time interval and attempting to re-establish the connection ends, when a determination is made that the connection to second node could be re-established by using the earlier known address of the second node before the time interval expires.

8. The method according to claim 5, wherein
data communicated between the nodes via the connection is data relating to an application carried on a layer above a layer of the connection, and wherein
the monitored time interval has a length that is shorter than a time required for the application to indicate a failure or terminate.

9. The method according to claim 1, wherein
the outage of the connection is based on a change of logical or physical channels of the connection.

10. The method according to claim 9, wherein
the connection changes from one type of connection to another type of connection.

11. The method as recited in claim 1, wherein said first node and said second node communicate via a connection within a communication network.

12. A computer-readable storage medium encoded with instructions configured to control a processor to perform a process, the process comprising:
    detecting, by a first node, an outage of an existing connection between the first node and a second node, wherein an address of the first node has not changed;

requesting, by said first node, after detecting the outage of the connection, from a name-to-address mapping node of a communication network a current address assigned to the second node;

receiving, from said name-to-address mapping node, a current address assigned to the second node; and re-establishing the existing connection, by said first node, based on the current address assigned to the second node.

13. An apparatus, comprising:

a processor; and a memory including computer program code, the memory and the computer program code configured to, with the processor, configure the apparatus at least to detect an outage of an existing connection between the apparatus and a second node via a communication network, wherein an address of the first node has not changed, request after detecting the outage of the connection, from a name-to-address mapping node of a communication network a current address assigned to the second node, and re-establish the connection based on a current address assigned to the second node.

14. The apparatus according to claim 13, wherein the memory and the computer program code are further configured to, with the processor, configure the apparatus at least to:

receive an error message informing the apparatus that a message addressed from the apparatus to the second node was not delivered.

15. The apparatus according to claim 13, wherein the memory and the computer program code are further configured to, with the processor, configure the apparatus at least to:

experience a timeout when waiting for a response or acknowledgement from the second node.

16. The apparatus according to claim 13, wherein the memory and the computer program code are further configured to, with the processor, configure the apparatus at least to:

monitor a time interval responsive to the detection of the outage; and request a current address of the second node from the name-to-address mapping node responsive to determining that the time interval has expired.

17. The apparatus according to claim 16, wherein the memory and the computer program code are further configured to, with the processor, configure the apparatus at least to:

re-establish the connection to the second node by using an earlier known address of the second node until the time interval expires.

18. The apparatus according to claim 17, wherein the memory and the computer program code are further configured to, with the processor, configure the apparatus at least to:

cease monitoring of the time interval and re-establish the connection, when a determination is made that the connection to the second node could be re-established by using the earlier known address of the second node before the time interval expires.

19. The apparatus according to claim 16, wherein data communicated between the apparatus and the second node via a connection comprises data relating to an application carried on a layer above a layer of the connection, and wherein the time interval monitored has a length that is shorter than a time required for the application to indicate a failure or terminate.

20. The apparatus as recited in claim 13, wherein said apparatus and said second node are configured to communicate with each other via a connection within a communication network.

21. The apparatus according to claim 13, wherein the outage of the connection is based on a change of logical or physical channels of the connection.

22. The apparatus according to claim 21, wherein the connection changes from one type of connection to another type of connection.

23. An apparatus, comprising:

a processor; and a memory including computer program code, the memory and the computer program code configured to, with the processor, configure the apparatus at least to assign a current address to a second node, the assigned address being associated with a lifetime attribute to cache address-to-name mapping entries of the second node in other nodes than a name-to-address mapping node, the lifetime attribute being set to zero or about zero, wherein a first node detects an outage of an existing connection between the first node and the second node, and an address of the first node has not changed.

* * * * *

UNITED STATES PATENT AND TRADEMARK OFFICE
CERTIFICATE OF CORRECTION

| | | |
|---|---|---|
| PATENT NO. | : 7,778,189 B2 | Page 1 of 1 |
| APPLICATION NO. | : 11/642638 | |
| DATED | : August 17, 2010 | |
| INVENTOR(S) | : Valli et al. | |

It is certified that error appears in the above-identified patent and that said Letters Patent is hereby corrected as shown below:

Column 16,
Line 24, "said consulting requesting comprises:" should read --said requesting comprises:--.

Signed and Sealed this
Twentieth Day of December, 2011

David J. Kappos
*Director of the United States Patent and Trademark Office*